United States Patent [19]

Lewis et al.

[11] 4,363,844
[45] Dec. 14, 1982

[54] METALLIZED INFORMATION CARRYING DISCS

[76] Inventors: Terry W. Lewis; Roger J. Anderson; Donald J. Kerfeld, all of P.O. Box 33427, Saint Paul, Minn. 55133

[21] Appl. No.: 189,000

[22] Filed: Sep. 22, 1980

[51] Int. Cl.³ .................... B32B 3/02; G11B 7/24
[52] U.S. Cl. .................................. 428/65; 428/64; 428/163; 428/174; 428/334; 428/335; 428/336; 428/463; 156/244.24; 156/245; 346/76 L; 346/135.1; 346/137; 358/344; 358/342; 369/275; 369/283; 369/284; 369/286; 369/288; 427/44; 427/54.1
[58] Field of Search .............. 369/283, 284, 275, 288, 369/286; 264/106, 107; 428/64, 65, 463, 174, 163, 334–336; 358/128.5, 128.6; 346/76 L, 77 E, 135.1, 137; 360/135; 427/44, 54.1; 156/272, 245, 244.24

[56] References Cited

U.S. PATENT DOCUMENTS

| 3,658,954 | 4/1972 | Broadbent | 264/1 |
| 3,795,534 | 3/1974 | Mehalso | 264/1 |
| 3,798,134 | 3/1974 | Hynes | 204/6 |
| 3,855,426 | 12/1974 | Bowhuis | 179/100.3 V |
| 3,882,214 | 5/1975 | Nosker | 264/106 |
| 3,901,994 | 8/1975 | Mehalso | 428/163 |
| 4,020,278 | 4/1977 | Carre' | 369/283 |
| 4,126,726 | 11/1978 | Soeding | 428/163 |
| 4,130,620 | 12/1978 | Jarsen | 264/225 |
| 4,188,433 | 2/1980 | Dijkstra | 428/64 |

Primary Examiner—Ellis P. Robinson

[57] ABSTRACT

A coded information structure capable of being decoded electronically comprising a base and a first layer of an electrically conductive or electromagneted radiation reflective layer adhered to said base wherein said layer having coded information in the form of areas of said layer having been vertically displaced and having ruptures or necking or the side of the depression and an insulating or transparent protective layer over said first layer.

37 Claims, 6 Drawing Figures

METALLIZED INFORMATION CARRYING DISCS

FIELD OF THE INVENTION

The present invention relates to information carrying articles and more particularly to information carrying discs which carry light readable or stylus readable information. These discs may be useful in carrying coded information which is convertible (i.e., electronically decoded) to electrical signals for such varied uses as sound recordings, audio/visual recordings, or computer information retrieval systems. A process for forming these information carrying articles and blanks from which the articles may be made is also disclosed.

BACKGROUND OF THE INVENTION

Information retrieval in the form of discs having coded data distributed in a circular or spiral pattern has been available in various forms for many years. Early forms of musical reproduction equipment, for example, used discs which either holes or protuberances to pluck an array of strings or vibrating posts to produce music. Early displays of moving pictures operated by a rotation of a disc bearing consecutive images on a periphery. The most common form of storing reproductions of music performances which has been in use for about 100 years, is the phonograph record which uses a spiral pattern of grooves having vertical and horizontal modulations to generate signals which can be converted to sound.

With the introduction of the laser to industry, a new information storage system has been developed which comprises a disc having circular or spiral patterns of depressions or protuberances which would disturb, reflect or refract incident or transmitted light patterns. These information storing discs, often used for storage of audio/visual information and generally referred to as video discs, are well known in the art. Such U.S. Pat. Nos. as 3,658,954; 3,795,534; 3,798,134; 3,855,426; 3,901,994; 4,124,672; 4,126,726; and 4,130,620 show various constructions, compositions, and processes for forming video discs.

U.S. Pat. No. 4,126,726 also shows the use of photocurable laquers to form an image carrying surface and to provide a protective cover over the information carrying surface when a reflective metal film is used. No information whatsoever with regard to the nature and properties of the radiation curable layer is provided. In all instances the reflective metal coatings are provided to the element after the information is applied to its surface.

SUMMARY OF THE INVENTION

It has been found according to the present invention that information storage devices, which may comprise discs having a circular or spiral pattern of grooves with modulations in a conductive or reflective metal layer, can be prepared from a blank element comprising a substrate which is or carries on at least one surface thereof a polymeric composition having a reflective or conductive coating on the surface of the coating before embossing. Reflective or capacitive video discs may be formed from blanks such as these by an embossing process described herein.

DESCRIPTION OF THE DRAWINGS

FIG. I shows a side view of a video disc blank.

FIG. II shows a side view of an embossed video disc blank with information carrying protuberances and depressions thereon.

FIG. III shows a side view of two embossed video disc blanks which have been joined to provide a disc which carries two different retrievable patterns of information. The embossed surfaces are joined face to face.

FIG. IV shows a side view of two embossed video disc blanks which have been joined back to back to provide a disc which carries two different retrievable patterns of information.

FIG. V shows a microscopic side view of an embossed video disc wherein a radiation reflecting or conductive metal film has been severed during embossing.

FIG. VI shows a microscopic side view of an embossed video disc wherein a conductive or radiation reflective metal film has stretched or necked during embossing.

DETAILED DESCRIPTION OF THE DRAWINGS

Figure 1:
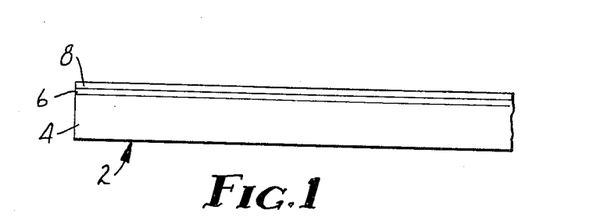
Figure 2:
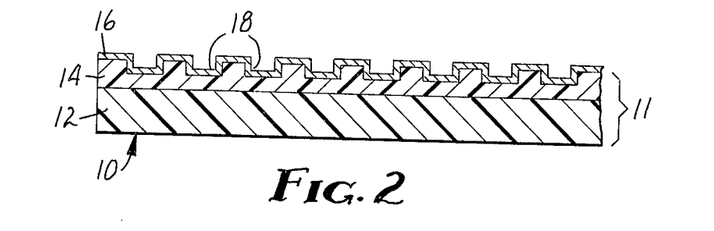
Figure 3:
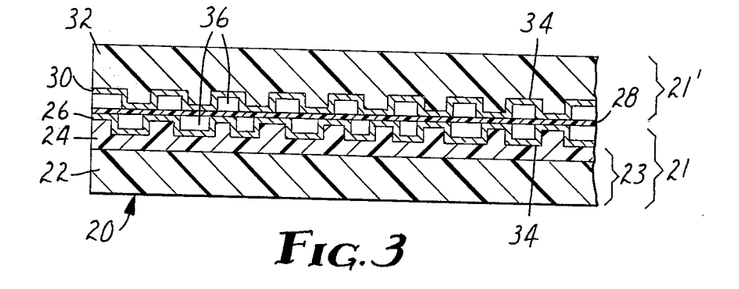
Figure 4:
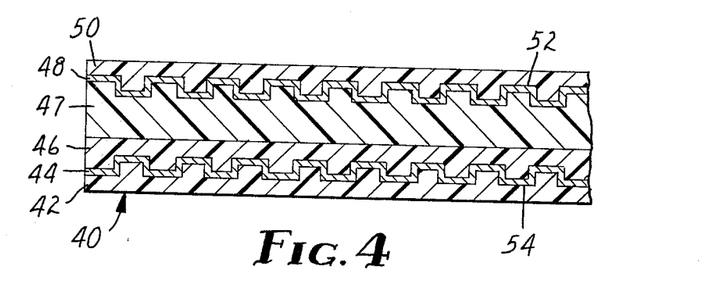
Figure 5:
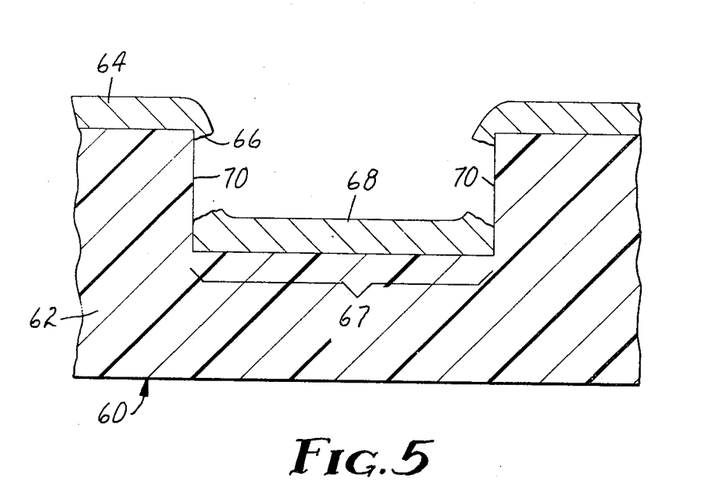
Figure 6:
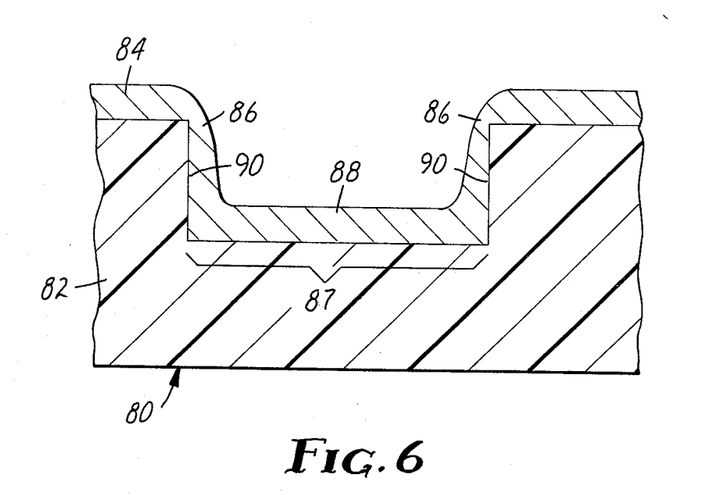

FIG. I shows a side view of an embossable video disk blank 2 comprising a base 4, a radiation reflective or conductive metal layer or conductive non-metallic layer 6, and an optional organic or inorganic (e.g., silica) polymeric protective coating layer 8. The base 4 may be unitary in construction or may be a composite layer such as a film layer having a further polymerizable or heat softenable coating layer on at least the surface adjacent to metal or non-metallic layer 6. The base 4 may be transparent or opaque and may comprise any material which can provide structural properties to the blank. If the base 4 itself is to be embossed to provide the information carrying surface structure, the composition of the base must be embossable and would be a thermoplastic or thermosoftenable material. If the base 4 carries an embossable layer on at least one surface thereof, the base 4 carrying the layer may be of metal, ceramic, fibrous, thermoplastic, thermoset, or filled polymeric materials, depending upon the manner in which the disc is read. If read by light reflection through the base, transparency would be required in the material selected.

FIG. II shows a section of an embossed video disc 10 having a base 11 comprising a substrate 12 carrying a coating 14 which was given surface structure by the embossing step. A metal layer 16 which was on the coating 14 before the embossing also carries the surface structure which consists of depressions such as 18.

FIG. III shows a section of a two sided video disc 20 comprising two separately prepared one sided video discs 21 and 22' which have been joined face to face by an adhesive layer 28. The one sided video disc 12 is shown as having been prepared from a blank having a base 23 comprising a substrate 22 and a coating 24 which carries the surface structure. A metal layer 26 on said coating 24 also displays the surface structure. The one sided video disc 21' is shown as comprising a single component base 32 on which the surface structure was embossed. A metal layer 30 on base 32 also displays the surface structure. The adhesive 28 joins the metal layers 26 and 30. These metal layers may have polymeric coatings or layers between the adhesive 28 and the metal layers 26 and 30, but this is optional. As shown in this figure, the adhesive 28 does not have to penetrate into the air cavities 36 to form a bond between the two one sided discs, although by using thicker adhesive layers, this may be accomplished. The presence of air is inconsequential between the two discs because the radiation used to read the patterns would pass through the base layers 21 and 21' and be reflected off the metal layers 26 and 28 and would not pass through the area between the indentations 34 in the surface structures. The two one sided discs may be formed in the same or different manners. That is, the figure shows a two component base 21 and a one component base 21' merely as a representation of one possible construction. Both bases may be of the same or different types of construction, with both, of course, being transparent to the radiation used to retrieve information from the discs.

FIG. IV shows a section of a two sided video disc 40 comprising a base 47 bearing information and a metal layer 48 on one surface and an embossed coating layer 46 with a metal layer 44 on the other surface. The embossed surface structures 52 and 54 face outward in this configuration. The information carrying surface structures 52 and 54 are coated with transparent protective layers 50 and 42 to prevent damage to the metal layers and penetration of foreign materials into the pattern of the information carrying surface structure. Two separately embossed discs may be adhesively bonded or fused back to back, or the disc blank may have two metal coatings, one each on opposite surfaces, to produce corresponding structures with the surface structure facing outward.

FIG. V shows a microscopic sectioned view of an embossed video disc 60. The base 62 carries a metal layer 64 which has been ruptured where the embossing has formed a depression 67 and displaced a piece of metal 68 into the base. The rupture 66 on the edge of metal layer 64 overlooking the metal free side wall 70 of the depression 67 is shown.

FIG. VI shows a microscopic sectioned view of an embossed video disc 80. The base 82 carries a metal layer 84 which has been stretched and necks at 86. This necking 86 has been caused by the formation of depression 87 in which a piece of metal 88 has been displaced into base 82 but has not separated from the original metal layer 84 and the necking is contiguous to the sidewall 90 of the depression.

DETAILED DESCRIPTION OF THE INVENTION

There are at least three aspects to the present invention, the multilayered article used to form the coded information bearing articles, the coded information bearing articles which may be electronically decoded, and the process of making the coded information bearing articles.

It would be helpful towards an appreciation of the nature of the present invention if certain concepts and parameters were understood. For example, the term coded information means information that can be read only by instrumentation, as opposed to visual images, lettering, and visually readable symbols of any sort. Surface modification of layers which produces variations in depth and consequent variations in conductivity and reflectivity is a conventional manner of providing coded information, as is the rearrangement of magnetic particles in other types of coded information bearing technologies. This information is defined as coded because it is not understandable or translatable by a human reader except by mechanical intervention. Just a phonograph record requires the use of a phonograph to decode the modulations in the grooves, the coded information in the articles of the present invention require mechanical intervention, defined herein as electronic decoding, to convert the coded information into a form more readily useful to a human audience. The terms electronic decoding or electronically decoded are defined as meaning that the coded information may be mechanically read, e.g., by reflected light, by capacitive voltage readout, and the like, and converted into electrical signals which may be translated into information which may be directly perceived by a human being such as printing, sound, television display, etc. The more preferred formats for electronically decoding the coded information bearing articles are capacitive readout and light reflective readout (especially from a laser) systems, such as those presently available for video discs, which produce an electrical signal which can be directly converted to another signal which can be projected and displayed on a television screen.

As all materials are conductive to some degree, the terms conductivity or conductive when used in reference to the coded information bearing layers define layers having a conductivity of less than 10,000 ohms per square, preferably less than 5000 ohms per square, and most preferably less than 2000 ohms per square.

Reflectivity must also be similarly considered, as most materials are reflective to some measurable degree. According to the practice of the present invention, a layer or an article is defined as reflective when it reflects at least 50% of incident electromagnetic radiation within a 50 nm range. Preferably the layer will reflect at least 70 or 75% of such incident radiation, and most preferably will reflect at least 85% of incident electromagnetic radiation within a 50 nm range.

Preferably the radiation which is used for measuring reflectivity is in the visible region of the electromagnetic spectrum, but ultraviolet radiation, infrared radiation, and radio waves might be useful for reading certain coded information.

Coded information is embossed into the conductive or reflective layer by vertical displacement of portions of that layer. This may be done by embossing a continuous pattern in the layer or preferably by embossing a pattern of discrete areas in which the displaced areas are connected to each other by non-displaced areas which are generally flat and which generally correspond to the plane of the original unembossed layer and the unembossed areas generally have the thickness of the original unembossed layer. The conductive or reflective layer must be embossable. Because the invention generally tends to use as little material in that layer as possible, embossability can be effected for many different materials. When a layer, such as one of aluminum, titanium, vapor deposited carbon, conductive resin or particulate-filled resin is coated as a thin layer on a substrate, that thin layer, for most macromolecular operations, including embossing, tends to adopt the physical properties (particularly with regard to elasticity and conformability) of the surface onto which it has been coated. This is particularly true for metal layers between 0.2 and 75 nm in thickness. Metal layers are defined as embossable when embossment with a pressure of no more than 150 kg/cm$^2$ at a temperture of no more than 200° C. will cause a replication of the embossing stamper to form on both sides of the metal layer. Replicability on the reverse side of filled polymeric materials used as the conductive or reflective layer is not essential. When a metal layer is recited as the embossable reflective or conductive layer, the limitation of two sided replicability (although, of course, not with identical resolution) is included within the definition of the term embossable.

The disc blanks useful in the practice of the present invention comprise a base of an embossable monolithic layer or a substrate having on at least one surface thereof an embossable polymeric material and a reflective or electromagnetic radiation reflective metal or non-metallic layer over said base. The embossable polymeric material may be present on a substrate as a coating or layer of any reasonable size, preferably of from 2 to 400 microns in thickness. The composition preferably has a maximum loss modulus ($G''_{max}$) which appears between the temperatures of 30° and 180° C. This will enable the composition to be readily embossed at temperatures between 50° to 200° C. (each temperature is 20° C. higher than $G''_{max}$) without being too soft at room temperature. Preferably $G''_{max}$ will appear between 40° and 100° C. Embossing is generally performed at a temperature at least 20° C. higher than $G''$, preferably between 25° and 100° C. higher than $G''$ to save energy. $G''$ (loss modulus) is the out-of-phase component of the applied strain. This value represents the energy not stored elastically through the following relationship:

$$W = \pi(\gamma)^2 G''$$

where W is the work per cycle under a given strain at a predetermined frequency (in radians/sec.), $\gamma$ is the initial strain, and $G''$ is the loss modulus.

The polymeric layer may be thermoplastic or a heat-softenable radiation curable layer and has on its exterior surface a reflective or conductive coating, preferably of metal between 0.2 and 200 nanometers in thickness and more preferably up to 75 nanometers in thickness. Preferably the coating is between 0.2 and 10.0 nm for a capacitive disc and 0.2 to 60 nm for a reflective disc. The base may be of any reasonable thickness, but is generally between $10 \times 10^{-2}$ and 2 millimeter. The thermoplastic or radiation curable layer should be at least 5 or 10.0 $\mu$m thick and preferably at least 25 $\mu$m thick. This is most important when this layer is a coating on a substrate. The reflective metal layer may comprise substantially any reflective metal such as chromium, aluminum, silver, gold, nickel, iron, titanium, rhodium, tantalum, tin, indium, alloys thereof, etc. The conductive metal layer may be of any conductive metal which includes all of the above and essentially every metal. The conductive layer may also be of carbon, conductive polymers, and conductive particulate filled polymers.

There are at least two different formats for video discs which may benefit from practice of the present invention. One is the capacitive readout mode and the other is the laser readout mode. The laser readout mode requires a reflective surface on the informaton bearing layer and the capacitive readout mode requires a conductive surface on the information bearing layer and an insulating layer over the conductive surface. The capacitive system, as is known in the art, requires a stylus to provide the ability to read the information and requires an insulating layer between the stylus and the information bearing metal layer. The insulating material may be any insulating material, but is preferably an organic polymeric material. Some lubricating properties, in the layer itself or in a coating, are particularly desirable in the capacitive system. In the capacitive mode, the polymeric material obviously need not be transparent. The insulating surface of the capacitive disc may be grooved to provide tracking for the stylus or may be flat with a separate tracking means. The insulating layer may be applied before or after embossing. The layer may be of from 1 to 100 nm thick and may be any insulating material including polymeric materials and insulating oxides such as $SiO_2$. Preferably the insulating layer is between 1 and 50 nm and may be applied by any conventional method including spin coating, sputtering, chemical evaporation, plasma polymerization, atomization, etc. The insulating layer need not be perfectly flat. When applied after embossing, for example, a definite variation in height of the layer over the surface structure can be seen and this modest variation does not adversely affect the information providing characteristics of the disc. As a matter of fact, the covering layer, being in some ways also a protective layer, is not of uniform thickness with respect to the surface of the layer and the coded information bearing layer and the vertically displaced areas. The only way in which uniformity could be readily effected would be by applying very thin layers of the protective material or by embossing a blank having the protective layer already thereon. That is, the thickness of the protective layer is different over the displaced areas from its thickness over non-displaced areas. Any variation from planarity which might exist in the surface of the layer (but which need not exist), does not exactly duplicate the variation in height or depth of the conductive or reflective layer, although with thin protective and/or insulating layers, the variations will bear some relationship to each other.

Amongst the useful radiation curable polymeric materials for use on at least one surface of a video disc blank may comprise a radiation curable thermoplastic polymer layer containing any addition polymerizable groups (e.g., ethylenically unsaturated materials such as acryloyl, methyacryloyl, allyl, acrylamido, et., epoxy, e.g., glycidyl, epoxycycloalkyl or epoxyalkylhydantoin). Such curable thermoplastic materials are disclosed for example in U.S. patent application Ser. No. 148,776, filed May 12, 1980 and U.S. patent application Ser. No. 109,192, filed Jan. 2, 1980. Other such compositions are also known in the art. The thermoplastic materials described in the above two applications are preferred materials according to the practice of the present invention.

The curable polymers of said U.S. Ser. No. 148,776 have repeating units of the general formula:

wherein
R is a single bond or an alkylene group having 1 to 6 carbon atoms and optionally one catenary oxygen;
$R^1$ is hydrogen but can be wherein $R^3$ is preferably alkenyl but can be alkyl having 2 to 5 carbon atoms and can be substituted by phenyl or carboxyl and $R^4$ is aliphatic or aromatic hydrocarbyl having up to 8 carbon atoms and is preferably acryloyloxyalkyl or a methacryloyloxyalkyl group, in which the alkyl group has 2 to 4 carbon atoms;

$R^2$ is hydrogen or methyl;

W is a divalent group that is required to complete a 5- or 6-membered heterocyclic ring, preferably, W is but W can be wherein $R^5$, $R^6$, $R^7$ and $R^8$ are independently hydrogen or lower alkyl of 1 to 4 carbon atoms;

Q is the divalent or trivalent residue of hydrocarbyl di- or tri-carboxylic acids, said residue formed by the removal of active hydrogens from the carboxylic acid groups and containing up to 40 carbon atoms, preferably containing 4 to 12 carbon atoms, and optionally containing catenary oxygen atoms, of which carboxylic acids at least 10 mole percent have alpha-methylene groups;

a is a zero or one, but can be one for no more than 20 mole percent of the carboxylic acids; and Z is These curable compounds generally can be prepared by the base catalyzed, preferably the tertiary amine catalyzed, reaction of one mole equivalent of a bis-(epoxy)heterocyclic compound and from about 0.8 to 1.2 mole equivalents of polycarboxylic acid (one or more dicarboxylic acids can be used) in accordance with the equation:

wherein R, $R^2$, Q, a, Z, and W are as defined before and b is a number having a value between about 5 and 60 sufficient to provide the polyester with a number average molecular weight between about 3,000 and about 30,000.

The catalyzed reaction, wherein a catalytically active amount of a base polymerization catalyst is utilized, can be performed in the presence or absence of solvent. Generally, the epoxide, polycarboxylic acid, catalyst, inhibitor for thermal polymerization, and solvent, if used, are heated from 50° to 120° C., preferably about 80° to 100° C., until the disappearance of the epoxy group as may be shown by chemical titration analysis, is observed. Heating for from 2 to 40 hours usually suffices to complete the reaction.

The hydroxyl groups present in compounds of formula I (i.e., where $R^1$ is hydrogen) can be acylated by treatment with an acylating agent, preferably by an acyl halide, an acyl anhydride, or an isocyanate that may contain polymerizable ethylenically unsaturated groups.

By adjustment of the ratio of bis-(epoxy)-heterocyclic compound to dicarboxylic acid, the terminal groups in the polyester can be controlled as is known in the addition polymer art. Thus, an excess (about 1 to 10%) of the bis-epoxide over the dicarboxylic acid gives polyesters having terminal epoxy groups and as excess (about 1 to 10%) of the dicarboxylic acid over the bis-epoxide gives polyesters having terminal carboxylic groups. Essentially equivalent amounts of bis-epoxide and dicarboxylic acid give polyesters having, on average, both carboxyl and epoxy terminal groups. When the terminal groups of the polyester are epoxy, these terminal groups are readily converted to acryloyl, methacryloyl or mixtures thereof by reaction with acrylic or methacrylic acid as is known in the art.

Suitable bis-epoxyheterocyclic compounds for use in the practice of the present invention have the formula:

wherein R, $R^2$ and W are as defined for Formula I. Examples of suitable bis-(epoxy)heterocyclic compounds include:
1,3-diglycidylhydantoin
1,3-diglycidyl-5-amylhydantoin
1,3-diglycidyl-5-octylhydantoin
1,3-diglycidyl-5-methylhydantoin
1,3-diglycidyl-5,5-dimethylhydantoin 1,3-diglycidyl-5-ethyl-5-methylhydantoin
1,3-diglycidyl-5-ethyl-5-hexylhydantoin
1,3-di(2-glycidyloxyethyl)-5,5-dimethylhydantoin
1,3-di(3-glycidyloxypropyl)-5,5-dimethylhydantoin
1,3-diepoxyethyl-5,5-dimethylhydantoin
1,3-diglycidyluracil
1,3-diglycidyl-6-methyluracil
1,3-diglycidyl-5,5-dimethyl-5,6-dihydrouracil
1,3-di(α-methylglycidyl)-5,5-dimethyl-5,6-dihydrouracil
1,3-diglycidylisocyanurate
1,3-diepoxyethylisocyanurate Other suitable bis-(epoxy)heterocyclic compounds are listed in U.S. Pat. Nos. 3,808,226 and 4,137,139 which are incorporated into this application by reference.

The preferred bis-(epoxy)heterocyclic compounds are the 1,3-diglycidylhydantoins such as
1,3-diglycidyl-5,5-dimethylhydantoin,
1,3-diglycidyl-5-ethyl-5-methyl-hydantoin,
1,3-diglycidyl-5-hexyl-5α-methylhydantoin, and
1,3-di(3-glycidyloxypropyl)-5,5-dimethylhydantoin.

Suitable polycarboxylic acids for use in the practice of this invention have the formula:

where Q and a and Z are as defined for formula I. The polycarboxylic acids may be saturated or unsaturated, aliphatic, cycloaliphatic, aromatic, or heterocyclic and may be substituted optionally by non-interfering groups such as alkyls, unsaturated alkyls, heterocyclics, sulfonates, esters, ethers, halohydrocarbons, amides and carbamates. Examples of suitable dicarboxylic acids include: oxalic, succinic, glutaric, adipic, suberic, sebacic, undecanedicarboxylic, hexadecanedicarboxylic, 1,2,3-propanetricarboxylic, tricarballylic, dimerized fatty acids (such as obtained by the polymerization of olefinically unsaturated monocarboxylic acids containing 16 to 20 carbon atoms such as oleic acid, linoleic acid and the like. The dimer acid of linoleic acid is described in U.S. Pat. No. 3,753,463). Other useful dicarboxylic acids are diglycolic, dilactic, 3,3'(ethylenedioxy)dipropionic, phthalic, isophthalic, terephthalic, 5-sulfonatoisophthalic, trimellitic, trimesic, diphenic, phenylenediacetic, benzylsuccinic, 1,4-naphthalenedicarboxylic, 5-chloro-1,3-benzene-dicarboxylic, tetrachlorophthalic, 1,2-cyclohexanedicarboxylic, 2,4-pyridinedicarboxylic, 2,5-tetrahydrofurandicarboxylic, maleic, but-2-enedioic, 1,5-pent-2-enedioic, itaconic, α-methyleneglutaric, α-methyleneadipic, α-methylitaconic, and α, α-dimethylitaconic acid.

The polyesters of the invention having 100 mole percent down to about 50 mole percent of alpha-methylene dicarboxylic acid and 0 to about 50 mole percent of dicarboxylic acid not having an alpha-methylene group are highly responsive to polymerization by actinic radiation even in the presence of oxygen. With a decrease of dicarboxylic acids having alpha-methylene content below about 50 mole percent, the rate of polymerization of the polyester decreases, so that below about 10-20 mole percent alpha-methylene-containing dicarboxylic acids, curing on exposure to actinic radiation proceeds very slowly.

The polyesters of the invention contain secondary hydroxyl groups which are formed on reaction of heterocyclic diepoxide with polycarboxylic acid as is shown in Equation II. These hydroxyls can be functionalized by reaction with an acylation group and thereby the polyester can be tailored to desirable properties such as increased solubility in a particular solvent, improved tensile strength and reduced flammability. In this manner, $R^1$ of formula I is replaced by Exemplary acylation agents from which $R^1$ is derived include acid chlorides such as acetyl chloride, propionyl chloride, valeryl chloride, dodecanoyl chloride, acryloyl chloride, methacryloyl chloride, alpha-chloroacryloyl chloride, crotonoyl chloride, benzoyl chloride, phenylacetyl chloride, cinnamoyl chloride and 2,4-dichlorophenylacetyl chloride; the corresponding caboxylic acids and anhydrides; other anhydrides include the anhydrides of dicarboxylic acids such as maleic anhydride, succinic anhydride, methylenesuccinic anhydride, phthalic anhydride, and 3-chlorophthalic anhydride; and organic isocyanates such as methyl isocyanate, ethyl isocyanate, n-butyl isocyanate, phenyl isocyanate, 4-t-butyl isocyanate, acryloyloxyethyl isocyanate, methacryloyloxyethyl isocyanate, 4-methacryloyloxybutyl isocyanate, 4-acryloylphenyl isocyanate and 4-vinylphenyl isocyanate. Preferred acylating agents are the acryloyloxyalkyl isocyanates in which the alkyl group has 2 to 4 carbon atoms such as methacryloyloxyethyl isocyanate. Other preferred acylating agents are maleic anhydride and succinic anhydride. The acryloyloxyalkyl isocyanates are preferred for acylation because of the relative ease of reaction with the secondary hydroxyls of the polyester and because they provide an efficient procedure for increasing the ethylenic unsaturation of the polyester. The anhydrides of dicarboxylic acids are preferred acylating agents. When these agents are used to acylate the secondary hydroxyls of the polyester, carboxyl groups are introduced, thereby increasing the solubility of the polyester in aqueous solvents.

By reaction of the secondary hydroxyls of the polyester with ethylenically unsaturated acylation agents, the ethylenic unsaturation of polyesters having a low content of backbone alphamethylene groups can be increased. This increase, of course, increases the rate of curing of the polyester on exposure to a given amount of energy.

Where the polyesters have been prepared using an excess of diepoxyheterocyclic compound, they contain terminal epoxy groups. These groups can be reacted with nucleophiles to open the epoxide ring and provide terminal ester groups. Where these nucleophiles are ethylenically substituted such as acrylic acid and methacrylic acid, the polyester becomes terminated with these groups.

The polymers of U.S. Ser. No. 109,119 filed Jan. 25, 1980 (which is incorporated herein by reference in its entirety for disclosure of the polymers and the method of making them) can be described by the formula:

Formula V wherein

M is a copolymer unit derived from one or more monomers (e.g., any free radically polymerizable, ethylenically unsaturated monomer;

$R^1$ is hydrogen or methyl;

$R^2$ is selected from a single bond, $-R^3-$, and in which $R^3$ is alkylene having 1 to 12 carbon atoms, preferably 1 to 6 carbon atoms, and W is $-O-$, $-S-$ or $-NH-$;

$R^4$ and $R^7$ are independently selected from a single bond and methylene, or substituted methylene having 1 to 12 carbon atoms;

$R^5$ and $R^6$ are independently alkyl or cycloalkyl having 1 to 12 carbon atoms, aryl or aralkyl having 6 to 12 carbon atoms or $R^5$ and $R^6$ taken together with the carbon to which they are joined form a 5- or 6-membered carbocyclic ring, or may be H when at least one of $R^4$ and $R^7$ is methylene;

n is 1, 2 or 3;

X is $-O-$, $-NH-$ or $-S-$;

A is a polymerizable, ethylenically unsaturated group selected from (a)

in which $R^8$ is an alkylene group having 1 to 12 carbon atoms, an arylene group having 6 to 10 carbon atoms, or an oxyalkylene group, $-(OR)_p$ in which R is a lower alkylene group having 2 to 4 carbon atoms and p is 1 to 4; $R^9$ and $R^{10}$ are independently hydrogen, and alkyl group having 1 to 12 carbon atoms, or an aryl group having 6 to 10 ring positioned carbon atoms wherein aryl is defined as a phenyl or naphthyl moiety optionally having substitution thereon or (b) $-R^8-WY$ in which $R^8$ is as defined under the definition for A, W as defined under the definition for $R^2$, and Y is an ethylenically unsaturated group selected from the group including acryloyl, methacryloyl, cinnamoyl, maleoyl, fumaroyl, itaconoyl and crotonoyl and is preferably acryloyl or methacryloyl;

a and b are independent whole integer numbers, and b is at least 1, sufficient to provide the polymer with a weight percent of M units in the azlactone-containing interpolymer between about 0 and 90, preferably 0 and 75.

The polymeric material on at least one face of the substrate which bears the reflective metal coating may also be a thermoplastic material which is not further curable. Thermoplastic materials of this type are well known in the art and include vinyl resins, polyesters, polyamides, polyolefins, polycarbonates, polyacrylates, polyvinyl acetate, styrene/acrylonitrile copolymers, etc. Preferably these polymers will have the same maximum loss modulus temperature range described above.

The thermoplastic compositions of the present invention are used in reflective or capacitive information carrying discs, and there is essentially no limitation on the types of additives which may be provided to the system where the polymer does not optically interact with the readout system as long as embossing is not prevented as by the inclusions of large dimensions reinforcing materials. For example, dyes, pigments, sensitizers, coating aids, plasticizers, surface active agents, reinforcing fillers such as diatomaceous earth, metal oxides, glass bubbles, talc, silica, and other materials may be readily included. As previously noted, the curable thermoplastic compositions of the present invention preferably have a maximum loss modulus at temperatures between 30° and 180° C. These properties are essential to practice of the present invention to enable flow of the material into the recess of the embossing master and for preventing an undue amount of stress from building up during shaping of the information carrying layer. These properties enable the low temperature manipulation of the information carrying layer to provide a high quality, imperfection free information carrying disc.

Where the curable polymer is not itself readily curable by radiation, polymerizable initiators or photoinitiators should be included within the composition. Initiators for free radical systems include such materials as peroxy, azo, and redox systems all of which are well known and are described frequently in the polymerization art. Included among free radical catalysts are the acyloins and their derivatives such as benzoin, benzoin methyl ether, benzoin ethyl ether, benzoin isopropyl ether, benzoin isobutyl ether, and α-methylbenzoin. Other useful systems include diketones such as benzil and diacetyl, organic sulfides such as diphenyl monosulfide, diphenyl disulfide, decyl phenyl sulfide, and tetramethylthiuram monosulfide, S-acyl dithiocarbamates, such as S-benzoyl-N,N-dimethyldithiocarbamate, phenones such as acetophenone, α,α,α-tribromoacetophenone, α,α-diethoxyacetophenone, benzophenone, and amino benzophenones, sulfonyl halides such as p-toluene sulfonyl chloride, 1-naphthalenesulfonyl chloride, 1,3-benzenedisulfonyl chloride, 2,4-dinitrobenzenesulfonyl bromide disulfonyl chloride and p-acetamidobenzenesulfonyl chloride. Normally such free radical photoinitiators are used in amounts ranging from about 0.01 to 5 percent by weight of the total polymerizable composition. When the initiator is used in excess of 5 percent by weight, little correspondingly improved effect can be expected. Thus addition of such greater quantities are economically unjustified. Preferably about 0.25 to 2 percent by weight of photoinitiator is used in the polymerizable composition.

Where the polymerizable groups on the thermoplastic radiation curable polymer are epoxy groups, photoinitiators such as the complex halogenide salts of aromatic diazonium, iodonium, and sulfonium cations are preferred. The salts are disclosed in the art, for example, U.S. Pat. Nos. 4,058,401, 4,069,054, and 4,161,478.

The polymerizable materials of the present invention may also contain amounts of non-polymerizable polymeric additives and polymerizable monomeric materials. These may be used to readily control the viscosity of the uncured composition as well as the degree of crosslinking in the cured product. Ethylenically unsaturated monomers suitable for saturation with the free radical polymers used in the present invention include methyl methacrylate, ethyl acrylate, 2-ethylhexyl acrylate, chlorohexyl acrylate, styrene, 2-chlorostyrene, 2,4-dichlorostyrene, acrylic acid, acrylamide, acrylonitrile, t-butyl acrylate, methyl acrylate, butyl acrylate, 2-(N-butylcarbamyl)ethyl methacrylate and 2-(N-ethylcarbamyl)ethyl methacrylate. Other diluting monomers that can be incorporated into the composition of the invention include 1,4-butylene dimethylacrylate or acrylate, ethylene dimethacrylate, hexanediol diacrylate or methacrylate, glyceryl diacrylate or methacrylate, glyceryl triacrylate or trimethylacrylate, pentaerythritol triacrylate or trimethacrylate, pentaerythritol tetraacrylate or tetramethacrylate, diallyl phthalate, dipentaerythritol pentaacrylate, neopentylglycol triacrylate, 1,3,5-tri(2-methacryoyloxyethyl)-s-triazine, and polyacryloyl-hydantoins such as those described in U.S. Pat. Nos. 3,808,226 and 3,852,302 and in assignee's copending patent application, Ser. No. 51,876, filed June 25, 1979.

In copolymerizations with thermoplastic polymers for epoxy functionalities therein, any comonomer known to be copolymerizable with epoxy groups may be added to the system, preferably with functionality of those groups.

The compositions of the invention as they are coated onto the substrate by such various means as handcoating, knife edge coating, gravure coating, roll coating, etc. are prepared by simply mixing (under "safe" conditions if the composition is to be sensitive to visible light) the radiation curable thermoplastic polymer and sensitizer (when used) the photoinitiator, and the other desired addenda including solvents. The coated composition is next coated (e.g., by vapor deposition or sputter coating) with a conductive or reflective metal film. The article is then embossed with a stamper so as to replicate the desired information carrying pattern on the surface of the disc. After the information carrying surface has been replicated on the disc, a protective and/or insulating layer of material may be coated thereon as is known in the art. This replication may be performed on one or both sides of the disc.

The information is encoded onto the element by deformation or disruption of the metal or non-metallic conductive coating layer. The essentially smooth planar metal layer in the blank is converted into a layer containing a circular or spiral pattern of depressions in which the approximately vertical walls surrounding the depressions have metal film which has necked to form a thin connection between the original layer and the flat central area of the depression. The walls may also be free of metal where the embossing has actually caused the metal in the depression to separate from the metal of the original layer. These two physical characteristics are distinctive indications that the metal coating layer was embossed. The dimensions of the depressions are also critical. The depth of the depression, from the surface metal layer to the bottom of the depression, is between 0.03 to 10 $\mu$m, generally between 0.03 to 5.0 $\mu$m, and preferably between 0.03 and 2.0 $\mu$m. Some readout systems can use depressions having depths in the range of 0.05 to 0.8 $\mu$m or even 0.07 to 0.5 $\mu$m.

The disc blanks are used in a process according to the present invention in which the blanks are converted to information carrying discs. This process is effected by taking one of the discs of the present invention and embossing it at a temperature which is usually between 15° and 150° C. above the $G_{max}''$ (Maximum loss modules) of the thermoplastic layer and a pressure which may, for example, be between 5 and 100 kg/cm². The embossing is performed with a negative stamper if the embossing is to face outwardly as in FIG. IV or with a positive stamper if the embossing is to face the interior as in FIG. III. This forms a spiral array or grooves in the thermoplastic base of radiation curable layer, which array bear depressions which vary in depth or height from the average level of the surface of the radiation curable layer by between 0.03 and 10.0 $\mu$m. When using a metal coated radiation curable layer, the composition would be irradiated to cure it and to retain the shape desired after or before release from the stamper.

The pressing may be done with a platen or with a roll embosser. If a further curable polymeric resin is used, irradiation is performed through the stamper if it is transparent and through the base if the stamper is opaque. Preferably the embossing is usually carried out at temperatures which are at least 15° C. above G'' and between 15° and 100° C. above the maximum loss modulus. More preferably it is carried out at temperatures between 20° and 70° C. above the maximum loss modulus. The pressure during embossing is preferably between 5 and 75 kg/cm² and more preferably between 10 and 50 kg/cm².

The information storage discs of the invention are provided with a reflective or conductive layer before the introduction of the information into the discs in accordance with well known techniques. Suitable materials for providing the reflective layer are elements which on chemical vapor deposition, electroless plating, electroplating, vapor deposition or sputtering (although the last is not preferred with radiation curable polymers) onto the storage disc which provide a layer having reflection greater than about 10 percent, often greater than 50 percent, preferably greater than 85 percent, at wavelengths of 500 nm or greater. Elements which remain nascent or form oxides (e.g., calcium and magnesium) can be used as long as the nascent metal or metal oxide coating is reflective and not significantly changed by air (i.e., become volatile or moisture sensitive). It is of course most preferred to use metals or alloys which are not readily oxidized or corroded in any fashion. The reflective or conductive layer can be about 0.2 to 75 nm preferably 0.2 to 60 nm in thickness depending on the particular thermoplastic material coated onto the disc substrate and the particular reflective material used. Suitable elements or oxides for use in the reflective layer are carbon, magnesium and magnesium oxide, aluminum, silicon, calcium and calcium oxide, titanium, vanadium, chromium, cobalt, nickel, copper, germanium, molyldenum, rhodium, silver indium, tin, tungsten, iridium, platinum, iron, gold and alloys thereof. Preferable metals are aluminum, chromium, iron, tin, indium, silver, gold, and alloys thereof. The combinations of metals, organic polymers, and additives would of course generally be selected so as to avoid chemical interaction and poor bonding between layers as is known in the art. Conductive layers may be produced by dispersing particles, e.g., carbon or metal, in binders such as organic polymers, and then coating thin films of these materials on the base. High particulate bonding is generally required to achieve good conductivity in such systems.

The metal layer may be coated with an additional thermoplastic or thermoset resin after embossing to protect the metal layer. The coating may also be applied to the metal layer before embossing if it is thin enough and it is also embossable. For example, a 0.5 to 50 nm polymeric embossable film over the metal layer is believed to be quite suitable during embossing. This film may also be a thermal or radiation curable material such as those described with regard to the polymeric layer on the substrate. If a radiation curable layer is used between a substrate an a metal layer, the metal layer can be of dimensions that will transmit a portion of the curing radiation (e.g., ultraviolet or e-beam radiation) and reflect a portion of the reading radiation (e.g., laser light). This can be achieved by the ordinarily skilled artisan. This is important mainly when a double sided blank is used or where the substrate is opaque.

EXAMPLE 1

A solution containing by weight 24.5 parts of the polymer described in Example 6 of U.S. patent application Ser. No. 148,776 filed on May 12, 1980, 0.5 parts of a free radical photoinitiator, 39 parts cyclohexanone, and 36 parts 2-methoxyethanol way filtered through a 5 $\mu$m filter. The resulting solution was coated on $1.75 \times 10^{-4}$ m polyvinylidene chloride primed polyethyleneterephthalate film using a wire wound bar. The coated sheets were air dried for 16 hours at 60° C.

One of these sheets was vapor coated with 2.7 nm of chromium. Coating was done by thermal evaporation in a background pressure of 3.5 $10^{-6}$ mm Hg.

The resulting metallized embossable sheet was embossed with video information with a metal stamper. A hydraulic press with a pressure of 37 Kg/cm$^2$ was used. The press platens were heated to 77° C.

After embossing, the sheet separated easily from the stamper. The sheet was cured by passing it five times at 5 cm/sec under a medium pressure mercury vapor lamps operating at 80 watts/cm. Exposure was through the uncoated side of the sheet. The sheet was then passed under the lamp five more times at the same speed. This time, the exposure was through the metal coated side of the sheet.

The resulting conductive video disc was given a thin insulating transparent polymeric coating over the metal layer. A plasma polymerization process was used to apply this insulating layer. This was performed by a diode-type radio frequency (13.56 mHz) sputter deposition unit with a 40 cm diameter cathode at a spacing of 8 cm which was utilized to plasma deposit a 35.5 nm thick methylmethacrylate dielectric spacer layer. The monomer feed mixture composed of 0.985 vapor fraction methylmethacrylate and 0.015 vapor fraction acrylic acid was introduced at a mass flow rate of about $4 \times 10^{-4}$ g/sec whereas the argon mass flow rate was about $3 \times 10^{-5}$ g/sec. A plasma polymerizing power of about 55 Watts (W) was used which corresponds to a power density of about 4.5 kW/m$^3$ and a power flux of about 450 W/m$^2$. The resulting disc displayed an accurate replication of the information on the stamper.

EXAMPLE 2

A $1.0 \times 10^{-4}$ m substrate comprising about $7.5 \times 10^{-5}$ m of weight polyethyleneterephthalate adhered to an embossable layer of a copolymer of polyethylene glycol and stoichiometric amount of a mixture of terephthalic acid (80%) and isopthalic acid (20% by weight) of about $2.5 \times 10^{-5}$ m was vapor coated with 30 nm of silver. This video disc blank was embossed in a press with a positive stamper for ten minutes at 120° C. and 45 Kg/cm$^2$, then cooled to 35° C. and removed from the master. The information of the stamper was accurately replicated on the disc which could then be used on a reflective laser readout video disc player.

EXAMPLE 3

A $1 \times 10^{-3}$ m poly(vinylchloride) substrate was vapor coated with 41 nm of silver. This coating was done by thermal evaporation at a background pressure of $5.0 \times 10^{-6}$ mm Hg.

The resulting metallized poly(vinylchloride) (hereinafter PVC) was embossed with video information using a metal stamper. A hydraulic press with a pressure of 15.5 Kg/cm$^2$ was used. The press platons were heated to 160° C. After cooling and separation from the stamper, scanning electron micrographs showed the information was replicated into the metalized PVC disc. A disc such as this could then be used on a reflective, laser readout video disc player.

EXAMPLE 4

A $1 \times 10^{-3}$ m PVC substrate was vapor coated with 28 nm of tin. This coating was done by thermal evaporation at a background pressure of $4.0 \times 10^{-6}$ mm Hg.

The resulting metallized PVC was embossed with video information using a metal stamper. A hydraulic press with a pressure of 15.5 Kg/cm$^2$ was used. The press platens were heated to 160° C. After cooling and separation from the stamper, scanning electron micrographs showed the information was replicated into the metalized PVC disc. A disc such as this could then be used on a reflective, laser readout video disc player.

EXAMPLE 5

A substrate and polymer coating as described in Example 1 was used in this example.

One of these sheets was vapor coated with 4.5 nm of chromium. This metal layer was coated with a 40 nm insulating layer as described by the plasma polymerization process in Example 1.

The resulting construction was embossed with video information using a metal stamper. A hydraulic press with a pressure of 333 Kg/cm$^2$ was used. The press platens were heated to 75° C.

After embossing the sheet was cured, in contact with the stamper, using an 80 watt/cm medium pressure mercury vapor lamp.

After separation of the resultant conductive video disc from the stamper, scanning electron micrographs showed the information had been replicated accurately into its surface. Such a disc would be suitable for playing on a capacitive video disc player.

EXAMPLE 6

A $1.0 \times 10^{-3}$ PVC substrate was vapor coated with 4.0 nm of chromium. This coating was done by thermal evaporation at a background pressure of $8.0 \times 10^{-6}$ mm Hg.

The resulting metallized PVC was embossed with video information using a metal stamper. A hydraulic press with a pressure of 15.5 Kg/cm$^2$ was used. The press platens were heated to 160° C.

After cooling and separation from the stamper, a 40.0 nm insulating layer was applied to the metal as described in Example 1.

The conductive video disc was suitable for pay on a capacitive video disc player.

EXAMPLE 7

A $2.5 \times 10^{-4}$ m PVC substrate was vapor coated with 4.7 nm of chromium. This metal layer was coated with a 40.0 nm insulating layer, as described in Example 1.

The above construction was embossed with video information using a metal stamper. A hydraulic press with a pressure of 222 Kg/cm$^2$ was used. The press platens were heated to 100° C. and cooled to 50° C. for removal of the stamper from the press.

After separation from the stamper, scanning electron micrographs showed the information had been replicated accurately into the surface of this conductive video disc. Such a disc would be suitable for playing on a capacitive video disc player.

EXAMPLE 8

A $1.75 \times 10^{-4}$ m thick sheet of polyvinylidene chloride primed polyethyleneterephthalate was coated with $1.0 \times 10^{-5}$ m of the polymer described in Example 6 of U.S. patent application Ser. No. 148,776 filed on May 12, 1980. The coating and drying procedures of Example 1 were used. The coated side of this sheet was vapor coated with 5.0 nm of chromium using a thermal evaporation technique.

A metal video disc stamper was used to thermally emboss this premetallized sheet. A hydraulic press operating at 37 kg/cm$^2$ was used. The press platens were heated to 65° C. After embossing, the radiation curable polymer was cured by exposure to UV radiation from an 80 watt medium pressure mercury vapor lamp.

Scanning electron microscopy of this video disc indicated good replication of the video disc stamper. The direct current resistance of the disc surface was found to be 4300 ohms per square.

EXAMPLE 9

A $1.75 \times 10^{-4}$ m thick sheet of polyvinylidene chloride primed polyethylene/terephthalate was coated with $1.0 \times 10^{-5}$ m of the polymer described in Example 6 of U.S. patent application Ser. No. 148,776 filed on May 12, 1980 using the procedures of Example 1. The coated side of this sheet was vapor coated with 6.0 nm of aluminum using a thermal evaporation process.

A metal video disc stamper was used to thermally emboss this premetallized sheet. A hydraulic press operating at 15 kg/cm$^2$ was used. The press platens were heated to 60° C. After embossing, the radiation curable polymer was used by exposure to UV radiation.

Scanning electron microscopy of the resulting video disc showed faithful reproduction of the submicron details of the metal stamper. The reflectivity of the surface of the replica, measured at 633 nm was 17%.

What is claimed is:

1. A coded information carrying structure capable of being electronically decoded comprising
   (1) a base,
   (2) a first layer of an electrically conductive or electromagnetic radiation reflective layer adhered to at least one surface of said base, said layer having coded information in the form of depressions in said layer having been vertically displaced a distance of from 0.03 to 10.0 micrometers, with said first layer having ruptures or necking on the sides of the depressions, and
   (3) an insulating or transparent protective layer over said first layer.

2. The structure of claim 1 wherein said protective layer is not of uniform thickness with respect to thickness measured from the surface of the protective layer to non-displaced areas of said electrically conductive or electromagnetic radiation reflective layer and said vertically displaced areas.

3. The structure of claim 2 wherein said vertically displaced areas are discrete areas deformed from said first layer and said protective layer is an organic polymer layer.

4. The structure of claim 2 wherein said first layer is a metal layer.

5. The structure of claim 3 wherein said first layer is a metal layer.

6. The structure of claim 2 wherein said structure is in the form of a disc.

7. The structure of claim 5 wherein said structure is in the form of a disc.

8. The structure of claim 2 wherein said base comprises a substrate wherein at least the surface of said base to which said first layer is adhered is a crosslinked polymer.

9. The structure of claim 5 wherein said base comprises a substrate wherein at least the surface of said base to which said first layer is adhered is a crosslinked polymer.

10. The structure of claim 1 wherein said vertically displaced areas form a spiral array of protrusions and/or depressions having an average variation in height or depth from the average surface level of the non-displaced surface of said first layer of from 0.03 to 10.0 micrometers.

11. The structure of claim 2 wherein said protective layer is an insulating layer of from 1 to 100 nm.

12. The structure of claim 7 wherein said protective layer is an insulating layer of from 1 to 100 nm.

13. The structure of claim 2 wherein said vertically displaced areas form a spiral array of protrusions and/or depressions having an average variation in height or depth from the average surface level of the non-displaced surface of said first layer of from 0.03 to 10.0 micrometers.

14. The structure of claim 5 wherein said metal layer has a thickness of from 0.2 to 200 nm.

15. The structure of claim 7 wherein said metal layer has a thickness of from 0.2 to 75 nm.

16. The structure of claim 7 wherein said metal layer has a thickness of from 0.2 to 75 nm.

17. The structure of claim 13 wherein said metal layer has a thickness of from 0.2 to 75 nm.

18. The structure of claim 17 wherein said metal layer comprises chromium, iron, nickel, rhodium, titanium, tantalum, aluminum, silver, gold, indium, tin, or alloys thereof.

19. The structure of claim 2 wherein said base has on opposite surfaces both
   (1) a first layer of an electrically conductive or electromagnetic radiation reflective layer adhered to at least one surface of said base, said layer having coded information in the form of areas of said layer having been vertically displaced, and
   (2) a protective layer over said first layer which is not of uniform thickness with respect to thickness measured from the surface of the protective layer to non-displaced areas of said electrically conductive or electromagnetic radiation reflective layer and said vertically displaced areas.

20. A composite structure comprising two structures according to claim 2 which are adhered so that the vertically displaced areas of each extend away from each other.

21. A composite structure comprising two structures according to claim 2 which are adhered so that the vertically displaced areas of each extend towards each other.

22. A two-sided information carrying structure comprising two bases, each base having a first layer of an electrically conductive or electromagnetic radiation reflective layer adhered to one surface of each base, said first layers having coded information in the form of depressions in said layer having been vertically displaced a distance of from 0.03 to 10.0 micrometers, with said first layers having ruptures or necking on the sides of the depressions, said first layers being adhered together.

23. The structure of claim 22 wherein said first layers are metal layers.

24. The structure of claim 8 wherein said protective layer is an insulating layer of from 1 to 100 nm.

25. The structure of claim 13 wherein said protective layer is an insulating layer of from 1 to 100 nm.

26. The structure of claim 12 wherein said insulating layer is an organic polymeric layer.

27. The structure of claim 25 wherein said insulating layer is an organic polymeric layer.

28. A process for forming an information bearing article which comprises embossing coded information which may be electronically decoded onto a multilayered article comprising
(a) a base having at least one thermoplastic surface and adhered onto said surface,
(b) an electrically conductive layer or electromagnetic radiation reflective layer
to form a coded information bearing surface on said layer, said coded information being formed by the vertical displacement of areas of said layer to a depth of 0.03 to 10.0 micrometers with said layer having ruptures or necking on the side of said depression.

29. The process of claim 28 wherein said areas are discrete areas.

30. The process of claim 28 wherein said vertically displaced areas form a spiral array of protrusions and/or depressions having an average variation in height or depth from the average surface level of the non-displaced surface of said layer of from 0.03 to 10.0 micrometers.

31. The process of claim 30 wherein said layer is a metal layer.

32. The process of claim 31 wherein said metal layer has a thickness of from 0.2 to 75 nm.

33. The process of claim 28 wherein said base comprises a substrate having as said at least one thermoplastic surface a layer of a thermoplastic, radiation curable, polymeric resin, and wherein said resin is irradiated to cure said resin during embossing and before said multilayered article is removed from the mold used during embossing.

34. The process of claim 33 wherein said irradiation is projected through the base.

35. The process of claim 33 wherein said radiation curable polymeric resin contains a multiplicity of radiation curable acryloyl or methacryloyl groups.

36. The process of claim 32 wherein said base comprises a substrate having as said at least one thermoplastic surface a layer of a thermoplastic, radiation curable, polymeric resin, and wherein said resin is irradiated to cure said resin during embossing and before said multilayered article is removed from the mold used during embossing.

37. The process of claim 33 wherein said radiation curable polymeric resin contains a multiplicity of radiation curable acryloyl or methacryloyl groups.

* * * * *

UNITED STATES PATENT AND TRADEMARK OFFICE
CERTIFICATE OF CORRECTION

PATENT NO. : 4,363,844

DATED : December 14, 1982

INVENTOR(S) : Terry W. Lewis et al

It is certified that error appears in the above-identified patent and that said Letters Patent is hereby corrected as shown below:

On the title page Insert:

-- (73) Assignee: Minnesota Mining and Manufacturing Company --.

Signed and Sealed this

Thirtieth Day of August 1983

[SEAL]

Attest:

GERALD J. MOSSINGHOFF

*Attesting Officer* — *Commissioner of Patents and Trademarks*